(12) United States Patent
Hirako

(10) Patent No.: US 9,592,754 B2
(45) Date of Patent: Mar. 14, 2017

(54) VEHICLE REAR SEAT CUSHION STRUCTURE

(71) Applicant: Toyota Jidosha Kabushiki Kaisha, Toyota-shi, Aichi-ken (JP)

(72) Inventor: Yutaka Hirako, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 151 days.

(21) Appl. No.: 14/462,917

(22) Filed: Aug. 19, 2014

(65) Prior Publication Data

US 2015/0054321 A1 Feb. 26, 2015

(30) Foreign Application Priority Data

Aug. 23, 2013 (JP) .................. 2013-173567

(51) Int. Cl.
  *B60N 2/42* (2006.01)
  *B60R 22/18* (2006.01)
  *B60N 2/68* (2006.01)
  *B60R 22/22* (2006.01)

(52) U.S. Cl.
  CPC .......... *B60N 2/4221* (2013.01); *B60N 2/688* (2013.01); *B60R 22/18* (2013.01); *B60R 22/22* (2013.01); *B60N 2/42* (2013.01); *B60N 2/4249* (2013.01); *B60R 2022/1806* (2013.01)

(58) Field of Classification Search
  CPC .................................................. B60R 22/22
  USPC ............... 297/216.15, 216.16, 480, 481, 482
  See application file for complete search history.

(56) References Cited

U.S. PATENT DOCUMENTS

| 3,608,963 A * | 9/1971 | Steere, Jr. ............... B60R 22/22 297/482 |
| 4,199,190 A * | 4/1980 | Lindblad ............ A44B 11/2546 24/323 |
| 5,248,356 A * | 9/1993 | Shimada ................. B60R 22/22 156/293 |
| 5,415,430 A * | 5/1995 | Valasin ................... B60R 22/22 280/801.1 |
| 5,845,939 A * | 12/1998 | Greiner ............... B60R 22/1951 280/806 |
| 6,666,520 B2 * | 12/2003 | Murphy ................. B60R 22/26 297/216.1 |
| 7,648,171 B2 * | 1/2010 | Marriott ............. A44B 11/2576 280/801.1 |
| 8,016,362 B2 * | 9/2011 | Itoga ...................... B60R 21/18 280/733 |

(Continued)

FOREIGN PATENT DOCUMENTS

| JP | 2001-163177 A | 6/2001 |
| JP | 2009-143287 A | 7/2009 |

(Continued)

*Primary Examiner* — David E Allred
(74) *Attorney, Agent, or Firm* — Dinsmore & Shohl LLP

(57) ABSTRACT

A vehicle rear seat cushion structure includes: an anchor plate mounted on a vehicle body; a buckle which is connected to the anchor plate via an inner webbing and with which a tongue plate attached to an occupant restraint webbing engages; a cushion pad in which a housing area which houses the buckle is formed on a position away from the anchor plate; and a cushion frame provided on a bottom portion of the cushion pad adjacent to the housing area to straddle the inner webbing from above.

20 Claims, 3 Drawing Sheets

(56) References Cited

U.S. PATENT DOCUMENTS

| | | | | |
|---|---|---|---|---|
| 8,789,889 B2* | 7/2014 | Mitsuo | ............ | B60R 22/26 |
| | | | | 297/482 |
| 2002/0063466 A1* | 5/2002 | Vits | ............ | B60N 2/242 |
| | | | | 297/483 |
| 2002/0101092 A1* | 8/2002 | Bowers | ............ | B60N 2/688 |
| | | | | 296/68.1 |
| 2003/0025380 A1* | 2/2003 | Vits | ............ | B60N 2/242 |
| | | | | 297/483 |
| 2004/0239164 A1* | 12/2004 | Vits | ............ | B60N 2/688 |
| | | | | 297/233 |

FOREIGN PATENT DOCUMENTS

| | | |
|---|---|---|
| JP | 2009-262633 A | 11/2009 |
| JP | 2010-047244 A | 3/2010 |
| JP | 2010-083396 A | 4/2010 |

* cited by examiner

VEHICLE REAR SEAT CUSHION STRUCTURE

INCORPORATION BY REFERENCE

The disclosure of Japanese Patent Application No. 2013-173567 filed on Aug. 23, 2013 including the specification, drawings and abstract is incorporated herein by reference in its entirety.

BACKGROUND OF THE INVENTION

1. Field of the Invention

The present invention relates to a vehicle rear seat cushion structure.

2. Description of Related Art

A structure in which an anchor member fixed to a floor portion of a vehicle body and a buckle are connected by a webbing to which an extending portion extending from a mounting portion of a buckle provided in boot (supporting member) is sewn has been disclosed (see Japanese Patent Application No. 2009-262633 (JP 2009-262633 A)). With this structure, the buckle can be supported in a standing state and the height from the floor portion of the vehicle body to an upper end portion of the buckle is shortened.

However, in the above-described example, it is believed that inertial migration of a lumber region of an occupant in the event of a frontal collision of a vehicle causes elongation of the webbing as well as deformation of a cushion pad of a rear seat, so that the buckle is pulled out and the amount of displacement of the lumber region is increased.

SUMMARY OF THE INVENTION

The present invention provides a vehicle rear seat cushion structure that improves occupant restraint property by a seat belt apparatus on a vehicle rear seat without any significant structure modification.

One aspect of the present invention relates to a vehicle rear seat cushion structure. The vehicle rear seat cushion structure includes: an anchor plate mounted on a vehicle body; a buckle which is connected to the anchor plate via an inner webbing and with which a tongue plate attached to an occupant restraint webbing engage; a cushion pad in which a housing area which houses the buckle is formed on a position away from the anchor plate; and a cushion frame provided on a bottom portion of the cushion pad adjacent to the housing area to straddle the above-described inner webbing from above.

In above-described aspect, when an inertia force accompanied with inertial migration of a lumber region of an occupant in the event of a frontal collision of a vehicle acts on the buckle via the occupant restraint webbing, the displacement to an upper direction of the vehicle of the inner webbing that connects the buckle to the anchor plate is limited by the cushion frame. Due to this, the deformation of the cushion pad due to the displacement of the inner webbing and the displacement of the buckle to the upper direction of the vehicle is inhibited, which decreases the amount of displacement of the lumber region of the occupant. Accordingly, with only a change of placement of the cushion frame, the occupant restraint property by a seat belt apparatus on a vehicle rear seat can be improved without any significant structure modification.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment that executes the present invention will be explained with reference to the drawings.

First Embodiment

Figure 1:
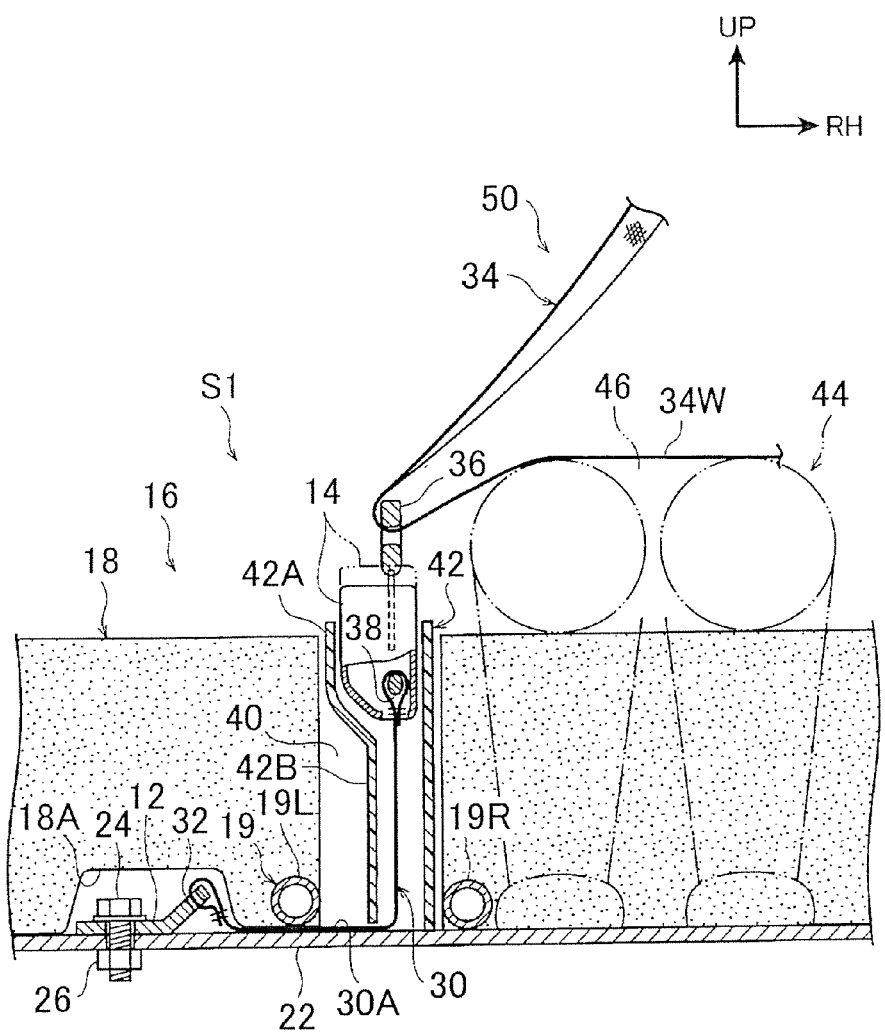
FIG. 1 is a cross-sectional view showing a vehicle rear seat cushion structure according to a first embodiment of the present invention.
Figure 2:
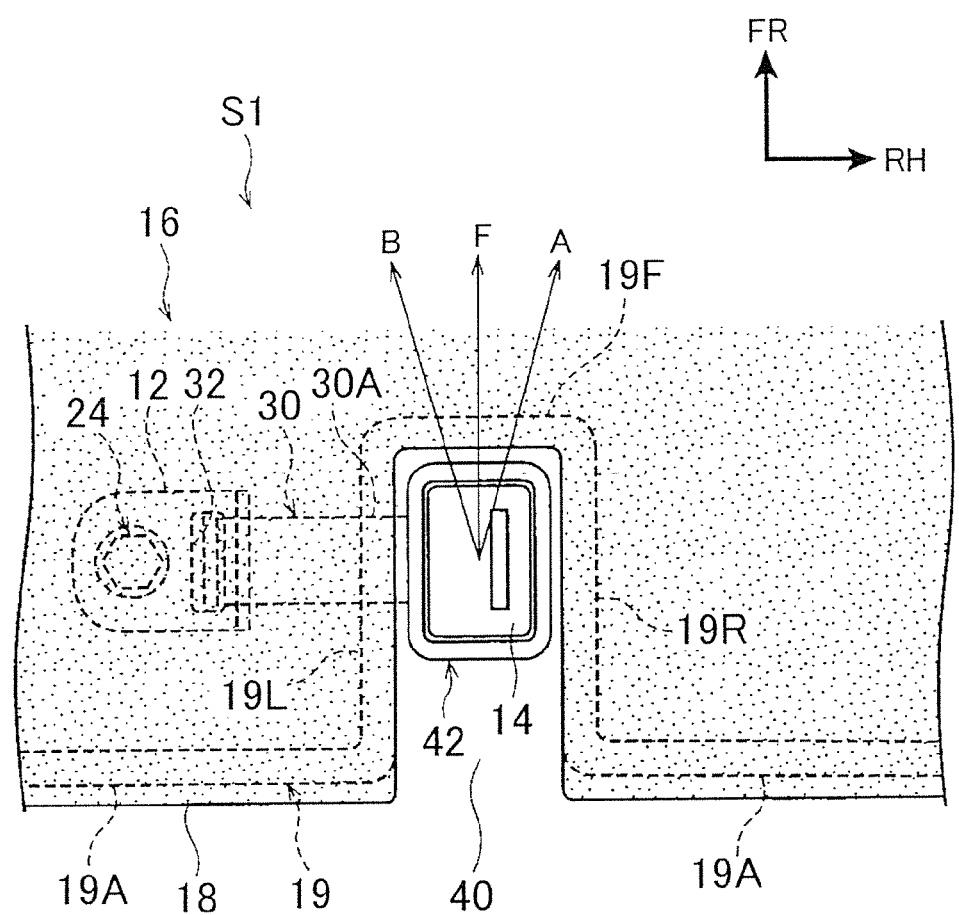
FIG. 2 is a plain view showing the vehicle rear seat cushion structure according to the first embodiment of the present invention.

In FIGS. 1 and 2, a vehicle rear seat cushion structure S1 according to this embodiment includes an anchor plate 12, a buckle 14, a cushion pad 18 and a cushion frame 19.

The anchor plate 12 is attached to a floor panel 22 which is one example of a vehicle body. This anchor plate 12 is a metal plate whose one side (right side of FIG. 1) is bent to be separated from the floor panel 22, and is fastened to the floor panel 22 via a bolt 24 and a nut 26, for example. On one end of the anchor plate 12, a slit-like through hole 32 is formed. To this through hole 32, one end side in a longitudinal direction of an inner webbing 30 formed like a belt by chemical fiber etc. is inserted. The one end side in the longitudinal direction of the inner webbing 30 inserted into the through hole 32 is wound around a hole edge portion of the through hole 32 and sewn overlapped with a middle section (normal portion) in the longitudinal direction of the inner webbing 30. Due to this, the one end side (left side of FIG. 1) of the inner webbing 30 is connected to the anchor plate 12.

The other end side (right side in FIG. 1) of the inner webbing 30 in the longitudinal direction is wound around a connecting portion 38 of the buckle 14 and sewn overlapped with a middle section (normal portion) in the longitudinal direction of the inner webbing 30. Due to this, the buckle 14 is connected to the anchor plate 12 via the inner webbing 30. A tongue plate 36 attached to an occupant restraint webbing 34 can engage with the buckle 14. When the tongue plate 36 engages with the buckle 14, a part of the occupant restraint webbing 34 corresponds to a wrap belt 34W that restrains a lumber region 46 of an occupant 44 seated in a vehicle rear seat 16. The occupant restraint webbing 34, the tongue plate 36 and the buckle 14 are parts of a seat belt apparatus 50 for the vehicle rear seat 16. As shown in FIG. 2, the inner webbing 30 extends in a width direction of the vehicle when viewing from upper side of the vehicle. That is, the anchor plate 12 and the buckle 14 are separated in the width direction of the vehicle when viewing from upper side of the vehicle.

A housing area 40 that houses the buckle 14 is formed in the cushion pad 18 on a position away from the anchor plate 12. In this embodiment, the housing area 40 is displaced from the anchor plate 12 to a right side in the width direction of the vehicle. As shown in FIG. 2, the housing portion 40 is constituted by a notch whose rear side of the vehicle is open, for example. The vehicle rear side of the housing area 40 is blocked by other parts (not shown) such as a seat back.

On a bottom portion of the cushion pad 18 overlapping with the anchor plate 12, a recess 18A to house the anchor plate 12 is formed.

In this housing area 40, rubber-made boot 42 for example is provided. An upper portion 42A of the boot 42 expands in the width direction of the vehicle compared to a lower portion 42B. An inner dimension in the vehicle width direction of the upper portion 42A is set to be slightly larger than the thickness in the width direction of the vehicle of the buckle 14. On the other hand, an inner dimension in the width direction of the vehicle of the lower portion 42B is set to be smaller than the thickness in the width direction of the vehicle of the buckle 14. This inhibits the buckle 14 from falling in the lower portion 42B of the boot 42. The length of the upper portion 42A in a up-and-down direction of the vehicle is set to be smaller than that of the buckle 14. This allows the upper portion of the buckle 14 to protrude above the boot 42. The inner webbing 30 enters the boot 42 from a lower end portion of the boot 42 and extends to an upper direction of the vehicle to be connected to the buckle 14.

A part of the cushion frame 19 is provided on a bottom portion of the cushion pad 18 adjacent to the housing area 40 and arranged to straddle the inner webbing 30 from above. The cushion frame 19 is constituted by a pipe or a wire, for example. More concretely, the cushion frame 19 straddles a portion 30A of the inner webbing 30 between the anchor plate 12 and the housing area 40 along the floor panel 22 from above. This portion 30A extends in the width direction of the vehicle, and the cushion frame 19 that straddles this portion 30A extends in the longitudinal direction of the vehicle. The inner webbing 30 is sandwiched between the cushion frame 19 and the floor panel 22.

As shown in FIG. 2, a part of the cushion frame 19 is arranged along a lateral side and a front side of the housing area 40 when viewing from upper side of the vehicle. Here, of the cushion frame 19, a left side portion of the housing area 40 is a left side portion 19L, a front portion of the vehicle is a front portion 19F and a right side portion of the vehicle is a right side portion 19R. The left side portion 19L and the right side portion 19R respectively extend in the longitudinal direction of the vehicle. The front portion 19F is a portion that connects a front end of the left side portion 19L and a front end of the right side portion 19R in the width direction of the vehicle. The left side portion 19L straddles the inner webbing 30. A rear end of the left side portion 19L and a rear end of the right side portion 19R are connected to a peripheral portion 19A. The peripheral portion 19A is arranged along an outer periphery of the bottom portion of the cushion pad 18.

The cushion frame 19 may be constituted by a single member, or may be constituted by a plurality of members.

Operation

This embodiment is configured as above, and its operation will be explained hereinafter. In FIG. 1, in the event of a frontal collision of the vehicle (for example, a full-wrap frontal collision), an inertia force accompanied with inertial migration of the lumber region 46 of the occupant 44 acts on the buckle 14 via the occupant restraint webbing 34 (wrap belt 34W). This inertia force acts on a front side of the vehicle (a direction of an arrow F when viewing from upper side of the vehicle) in the event of a full-wrap frontal collision of the vehicle. Since the buckle 14 is positioned at a lower portion on the rear left to a position of the lumber region 46 wrapped by the wrap belt 34W, owing to the inertial force, the buckle 14 and the inner webbing 30 that connects the buckle 14 to the anchor plate 12 are pulled obliquely forward of an upper side of the vehicle.

At this time, since the left the side portion 19L of the cushion frame 19 straddles the portion 30A of the webbing 30 along the floor panel 22 between the anchor plate 12 and the housing area 40, the displacement of this portion to the upper side of the vehicle is limited. The portion 30A of the inner webbing 30 is sandwiched between the left side portion 19L of the cushion frame 19 and the floor panel 22, and further, the inner webbing 30 enters the boot 42 from the lower end portion of the boot 42 and extends to the upper side of the vehicle to be connected to the buckle 14. In this way, the degree of freedom of the displacement of the inner webbing 30 is limited by the cushion frame 19.

Since the deformation of the cushion pad 18 and the displacement of the buckle 14 to the upper side of the vehicle (see a phantom line of FIG. 1) due to the displacement of the inner webbing 30 are inhibited, the displacement of the wrap belt 34W to the front side of the vehicle is inhibited, so that the amount of displacement of the lumber region 46 of the occupant 44 is decreased. Accordingly, with only a change of placement of the cushion frame 19, the occupant restraint property by the seat belt apparatus 50 of a vehicle rear seat 16 can be improved without any significant structure modification.

As shown in FIG. 2, the inertia force accompanied with inertial migration of the lumber region 46 of the occupant 44 acts obliquely forward of a collision side in the event of an oblique collision of the vehicle. More concretely, in the event of the oblique collision of a front right portion of the vehicle, a direction of the inertia force acting on the buckle 14 is an oblique front right direction (a direction of an arrow A when viewing from upper side of the vehicle). Moreover, in the event of the oblique collision of a front left portion of the vehicle, a direction of the inertia force is an oblique front left direction (a direction of an arrow B when viewing from upper side of the vehicle).

In this embodiment, the cushion frame 19 is arranged along the lateral side and the front side of the housing area 40 when viewing from upper side of the vehicle (the left side portion 19L and the front portion 19F). Accordingly, not only that the displacement of the inner webbing 30 to the upper side of the vehicle can be limited by the left side portion 19L of the cushion frame 19, but also that the displacement of the inner webbing 30 to the front side of the vehicle can be limited by the front portion 19F of the cushion frame 19. Due to this, not only in the event of the full-wrap frontal collision of the vehicle, but also in the event of the oblique collision, the amount of displacement of the lumber region 46 of the occupant 44 is decreased and the occupant restraint property by the seat belt apparatus 50 can be improved.

Second Embodiment

Figure 3:
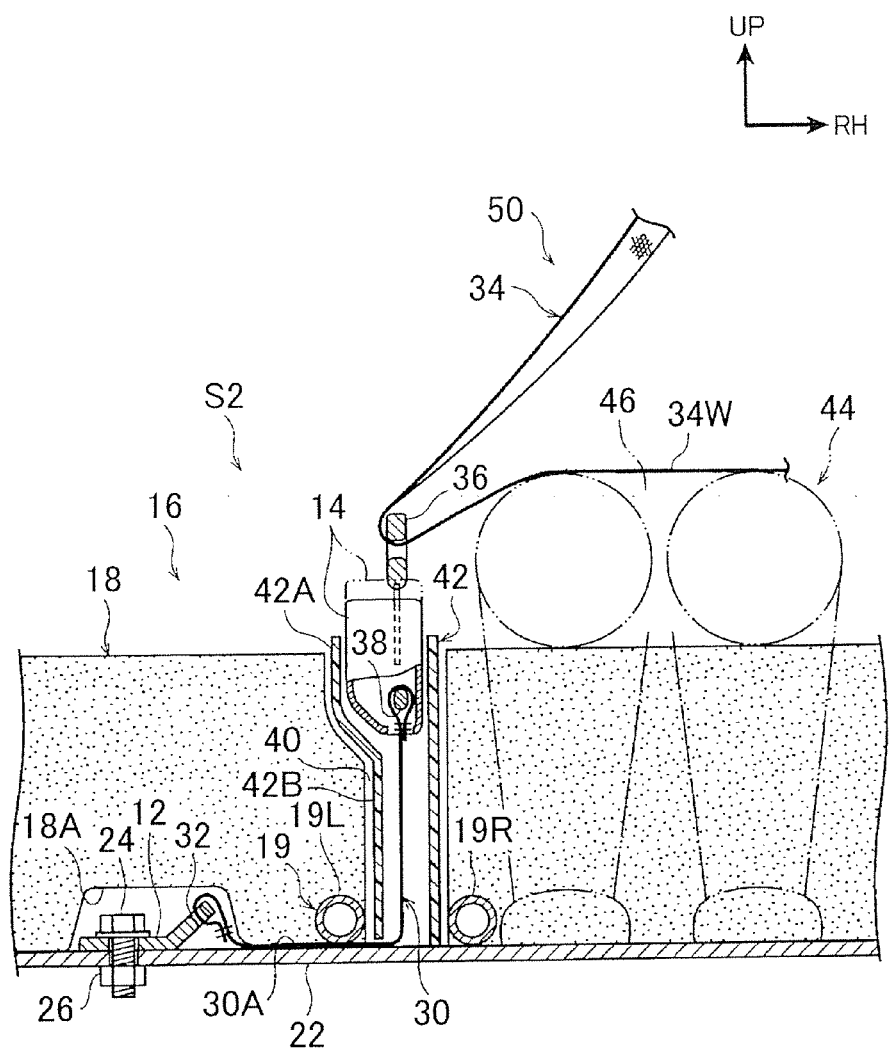
FIG. 3 is a cross-sectional view showing a vehicle rear seat cushion structure according to a second embodiment of the present invention.

In FIG. 3, in a vehicle rear seat cushion structure S2 according to this embodiment, the housing area 40 of the cushion pad 18 is formed along the shape of a section from the upper portion 42A to the lower portion 42B of the boot 42. Compared to the first embodiment, the left side portion 19L of the cushion frame 19 is close to the lower portion 42B of the boot 42. Consequently, the degree of freedom of the displacement of the inner webbing 30 is further limited. This further limits the displacement of the wrap belt 34W to the front side of the vehicle in the event of the frontal collision of the vehicle, so that the amount of displacement of the lumber region 46 of the occupant 44 is also decreased.

Due to this, the occupant restraint property by the seat belt apparatus 50 can be further improved.

Since other points are the same as those in the first embodiment, like numerals denote like elements, and their explanation is omitted.

Other Embodiments

While the floor panel 22 is listed as one example of the vehicle body, a portion of the vehicle body on which the anchor plate 12 is mounted is not limited to this. While the portion 30A of the inner webbing 30 along the floor panel 22 is sandwiched between the cushion frame 19 and the floor panel 22, not limited to this, the cushion frame 19 may be away from the inner webbing 30. Moreover, the inner webbing 30 may be not along to the floor panel 22.

While the cushion frame 19 is arranged along the lateral side and the front side of the housing area 40 when viewing from upper side of the vehicle, not limited to this, any configuration is acceptable as long as the cushion frame 19 at least straddles the inner webbing 30.

What is claimed is:

1. A vehicle rear seat cushion structure comprising:
   an anchor plate mounted on a vehicle body;
   a buckle which is connected to the anchor plate via an inner webbing and with which a tongue plate attached to an occupant restraint webbing engages;
   a cushion pad in which a housing area which houses the buckle is formed on a position away from the anchor plate; and
   a cushion frame provided within a bottom portion of the cushion pad adjacent to the housing area, the cushion frame holds a portion of the inner webbing against the vehicle body.

2. The vehicle rear seat cushion structure according to claim 1, wherein
   the portion of the inner webbing, positioned between the cushion frame and the vehicle body, is between the anchor plate and the housing area.

3. The vehicle rear seat cushion structure according to claim 1, wherein
   the inner webbing extends in a width direction of a vehicle when viewing from an upper side of the vehicle, and
   the cushion frame is arranged along a lateral side and a front side of the housing area when viewing from the upper side of the vehicle.

4. The vehicle rear seat cushion structure according to claim 3, wherein
   the cushion frame includes a left side portion that extends in a longitudinal direction of the vehicle on a left side of the housing area, a right side portion that extends in the longitudinal direction of the vehicle on a right side of the housing area, a front portion that connects a front end of the left side portion and a front end of the right side portion in the width direction of the vehicle and a peripheral portion connected to a rear end of the left side portion and a rear end of the right side portion and arranged along an outer periphery of the bottom portion of the cushion pad, when viewing from the upper side of the vehicle.

5. The vehicle rear seat cushion structure according to claim 1, wherein
   the vehicle body is a floor panel.

6. The vehicle rear seat cushion structure according to claim 1, wherein
   the housing area is constituted by a notch having an open rear side in a vehicle longitudinal direction.

7. The vehicle rear seat cushion structure according to claim 6, wherein
   the open rear side of the housing area is blocked by a seat back.

8. The vehicle rear seat cushion structure according to claim 1, wherein
   the cushion frame is constituted by a pipe or a wire.

9. The vehicle rear seat cushion structure according to claim 1, wherein
   a lower area of the housing area is set to have a smaller width in a width direction of a vehicle than that of its upper area.

10. The vehicle rear seat cushion structure according to claim 1, further comprising:
    a boot which is provided in the housing area and has an upper portion from which the buckle protrudes and a lower portion into which the inner webbing connected to the buckle is inserted, wherein
    the upper portion of the boot is formed to expand in a width direction of a vehicle compared to the lower portion, and
    the housing area is formed along a shape of a section of the boot from the upper portion to the lower portion of the boot.

11. The vehicle rear seat cushion structure according to claim 1, wherein
    the cushion frame holds a portion of the inner webbing against the vehicle body to limit displacement of the inner webbing in an upper direction of the vehicle.

12. The vehicle rear seat cushion structure according to claim 1, wherein
    the cushion frame is provided in an end portion of the cushion pad in a width direction of a vehicle.

13. A vehicle rear seat cushion structure comprising:
    an anchor plate mounted on a vehicle body;
    a buckle which is connected to the anchor plate via an inner webbing and with which a tongue plate attached to an occupant restraint webbing engages;
    a cushion pad in which a housing area which houses the buckle is formed on a position away from the anchor plate; and
    a cushion frame provided on a bottom portion of the cushion pad adjacent to the housing area to straddle the inner webbing from above, the cushion frame holds a portion of the inner webbing against the vehicle body, and the cushion frame is arranged along a lateral side and a front side of the housing area when viewing from an upper side of the vehicle,
    wherein the inner webbing extends in a width direction of a vehicle when viewing from the upper side of the vehicle,
    wherein the cushion frame includes a left side portion that extends in a longitudinal direction of the vehicle on a left side of the housing area, a right side portion that extends in the longitudinal direction of the vehicle on a right side of the housing area, a front portion that connects a front end of the left side portion and a front end of the right side portion in the width direction of the vehicle and a peripheral portion connected to a rear end of the left side portion and a rear end of the right side portion and arranged along an outer periphery of the bottom portion of the cushion pad, when viewing from the upper side of the vehicle.

14. The vehicle rear seat cushion structure according to claim 13, wherein
    the vehicle body is a floor panel.

15. The vehicle rear seat cushion structure according to claim 13, wherein
the housing area is constituted by a notch having an open rear side in a vehicle longitudinal direction.

16. The vehicle rear seat cushion structure according to claim 15, wherein
the open rear side of the housing area is blocked by a seat back.

17. The vehicle rear seat cushion structure according to claim 13, wherein
the cushion frame is constituted by a pipe or a wire.

18. The vehicle rear seat cushion structure according to claim 13, wherein
a lower area of the housing area is set to have a smaller width in a width direction of a vehicle than that of its upper area.

19. The vehicle rear seat cushion structure according to claim 13, further comprising:
a boot which is provided in the housing area and has an upper portion from which the buckle protrudes and a lower portion into which the inner webbing connected to the buckle is inserted, wherein
the upper portion of the boot is formed to expand in a width direction of a vehicle compared to the lower portion, and
the housing area is formed along a shape of a section of the boot from the upper portion to the lower portion of the boot.

20. The vehicle rear seat cushion structure according to claim 13, wherein
the cushion frame is provided in an end portion of the cushion pad in a width direction of a vehicle.

* * * * *